United States Patent Office 3,391,122
Patented July 2, 1968

3,391,122
CATALYTIC ESTER INTERCHANGE REACTION IN PROCESS FOR PREPARING LINEAR POLYESTERS
Lee O'Daniel Bice and Thomas Hector Suarez, Kinston, N.C., assignors to E. I. du Pont de Nemours and Company, Wilmington, Del., a corporation of Delaware
No Drawing. Filed July 15, 1963, Ser. No. 295,235
1 Claim. (Cl. 260—75)

This invention relates to an improved method for preparing a synthetic linear polyester and, more particularly, to a catalytic process for preparing filament- and film-forming ethylene terephthalate polymers.

The production of the novel class of film- and fiber-forming linear polyesters of terephthalic acid and a glycol is fully disclosed in U.S. Patent No. 2,465,319 to Whinfield and Dickson. An improved process for preparing a highly polymeric polyethylene terephthalate from a glycol and a lower alkyl ester of terephthalic acid is further disclosed in U.S. Patent No. 2,951,060 to Billica which provided a catalyst particularly effective in promoting the ester interchange reaction in the preparation of polyethylene terephthalate from a glycol and dimethyl terephthalate. Briefly, the process comprised carrying out the ester exchange reaction between a glycol, e.g., ethylene glycol, and a lower alkyl terephthalate, e.g., dimethyl terephthalate, in the presence of catalytic amounts of a manganese compound, and thereafter polymerizing the resulting glycol terephthalate, preferably in the presence of an added polymerication catalyst, and a substance operative as a color inhibitor.

According to the prior art, many references are made to the use of various catalysts, generally of a metallic type, in the ester exchange reaction. Some references are made also to combinations of catalysts, such as certain amphoteric compounds and alkali metal salts, which are particularly useful for direct esterification reactions. However, it is recognized in the unpredictable and empirical nature of inventions involving catalytic actions that catalysts for direct esterification reactions have little or no catalytic action in ester exchange reactions. In addition, the direct estetrification reactions are known to be slow compared to the ester exchange reactions usually used to prepare linear polyesters in an economical, commercial process.

An object of this invention is to provide an improved catalyst system for the ester exchange reaction. Another object is to provide a catalyst system which is particularly effective in reducing corrosion of the equipment used to carry out the continuous reaction. Still another object is to provide a catalyst system which is particularly effective in eliminating the development of scale on the surfaces of the equipment used to carry out the continuous reaction. These and other objects will more clearly appear hereinafter.

The foregoing objects are realized by the present invention which briefly stated comprises carrying out the ester interchange reaction between the glycol and the lower alkyl terephthalate starting at a temperature of 140° C. in the presence of catalytic amounts of a mixture 3 to 5 parts by weight manganous acetate and 1 part by weight sodium acetate, and thereafter polymerizing the resultant glycol terephthalate, preferably in the presence of an added polymerization catalyst.

The process of the present invention will hereinafter be described specifically with respect to the preparation of bis-2-hydroxy-ethyl terephthalate monomer by an ester interchange reaction between ethylene glycol and dimethyl terephthalate, which process constitutes the preferred embodiment of the invention. The invention, however, is applicable, in general, to the preparation of other monomeric glycol terephthalates by conducting an ester interchange reaction between various other glycols of the series $HO(CH_2)_nOH$, where $n$ is an integer within the range of 2 to 10 inclusive, and various other alkyl terephthalates, i.e., terephthalate esters of saturated aliphatic monohydric alcohols containing up to and including four carbon atoms, e.g., diethyl, dipropyl and diisobutyl terephthalates. Various specific glycols include trimethylene glycol, tetramethylene glycol, pentamethylene glycol, hexamethylene glycol, heptamethylene glycol, octamethylene glycol, etc. The catalysts of the present invention may also be employed in carrying out ester interchange reactions between mixtures of different esters and at least one polymethylene glycol or polyethylene glycol. For example, a mixture of dimethyl terephthalate, dimethyl sebacate or a mixture of dimethyl terephthalate and dimethyl hexahydroterephthalate and ethylene glycol may be reacted together to form the mixed esters which, in turn, may be polymerized to form a linear copolyester. Ester interchange reactions of this type are illustrated in U.S. Patents Nos. 2,623,033 and 2,623,031, issued in the name of Mark D. Snyder.

The selection of a catalyst system is a particularly complex and essentially empirical process. It is necessary to evaluate the effects of the catalyst system on the rate of reaction, on the efficiency of the reaction, on the many qualities of the final product, and on the economics of the catalyst, to name but a few considerations. Solubility of the catalyst at each stage of the process is a particularly important factor in a continuous process for the production of polyethylene terephthalate, since deposits of insoluble materials in the reaction vessels and interconnecting pipes must be avoided. Many of the inorganic compounds of manganese (such as the oxides, carbonate, nitrate, and sulfate) are low in solubility or are otherwise undesirable because of low ester exchange rate or because they produce color to a high degree during polymerization. Manganous salts of dicarboxylic acids are usually found to be unsatisfactory because of low ester exchange rate, and many of these salts are virtually insoluble in glycol.

In addition to solubility, the corrosive nature of the catalyst has been found to be a source of polymer contamination and equipment failure, particularly in the operation of a continuous process.

It is generally known that manganous acetate should be used in amounts from 0.01% to 0.3% by weight of manganous acetate based on the weight of dimethyl terephthalate and that lesser amounts of catalysts are decreasingly effective in promoting rapid reaction, which is initiated at 170° C.

The use of sodium acetate as the single catalyst for the ester interchange reaction has frequently been described, e.g., in Griehl and Schnock, J. Poly. Sci., 30, 413 (1958), as requiring a long reaction time and, therefore, is commerically unacceptable.

It has now been found that the addition of sodium acetate to the manganous acetate catalyst in proportions of at least 1 part sodium acetate to every 5 parts by weight of manganous acetate and, at most, 1 part of sodium acetate for every 3 parts of manganese acetate is sufficient to virtually eliminate corrosion of the metallic surfaces of the reactor vessels without adversely affecting the rate of the reaction of the ester interchange. In fact, it has been found that the presence of the sodium acetate in combination with manganous acetate will initiate the reaction at a lower temperature and permits more efficient utilization of the ester interchange column generally used for this process.

The mixed manganous acetate and sodium acetate catalyst of this invention is effective for both the ester exchange reaction and the subsequent polymerization reaction, so that the complete process is conveniently carried out without the addition of further catalytic material. Frequently, however, even better results will be obtained when a secondary catalyst is used in combination with the ester exchange catalyst of this invention. Antimony, germanium, and titanium compounds are particularly effective as auxiliary catalysts especially with reference to the second or polymerization stage of the reaction. Often a secondary catalyst is conveniently introduced at the beginning of the process, although it will sometimes be desirable not to add the secondary catalyst until the ester exchange reaction has been completed. Examples of specific polymerization catalysts have been described in the prior art and are not considered a part of this invention.

The following examples will serve to further illustrate the principles and practice of this invention.

EXAMPLE I

This example illustrates the use of various concentrations of manganous acetate and sodium acetate compounds as catalysts in the preparation of polyethylene terephthalate from dimethyl terephthalate (DMT) and ethylene glycol. The results are recorded in Table I.

In each case, the reaction was carried out in the following manner: 50 parts of dimethyl terephthalate and 50 parts of ethylene glycol were placed in a flask together with the amount of catalyst indicated in the table (parts per million calculated on the basis of anhydrous compounds). The flask was fitted with a condenser and heated at atmospheric pressure, whereupon the mixture began to evolve methanol in the range 140° to 210° C., the temperature depending on the catalyst and its concentration. Heating was continued at such a rate that continuous gentle ebullition was maintained until no further methanol was evolved, the final pot temperature being about 210° C. in each case. The liquid was then introduced into a polymerization tube, and an auxiliary catalyst or a color inhibitor was added. The mixture was heated at 275° C. under a vacuum of 0.5 to 1.0 mm. of mercury for two hours. A continuous stream of nitrogen was introduced through a capillary tube to agitate the mixture.

TABLE I

| Run | Catalyst | Concentration in p.p.m.[1] | Time Required to Complete Evolution of Methanol (minutes) | Temperature at which Reaction was Started (° C.) |
| --- | --- | --- | --- | --- |
| 1 | Manganous Acetate | 150 | 60 | 170 |
| 2 | do | 150 | 65 | 140 |
| 3 | Manganous Acetate and | 150 | 55 | 170 |
|   | Sodium Acetate | 30 |   |   |
| 4 | Manganous Acetate and | 150 | 55 | 140 |
|   | Sodium Acetate | 30 |   |   |
| 5 | Manganous Acetate | 100 | 75 | 140 |
| 6 | Manganous Acetate and | 100 | 62 | 140 |
|   | Sodium Acetate | 20 |   |   |
| 7 | Manganous Acetate and | 150 | 55 | 170 |
|   | Sodium Acetate | 50 |   |   |
| 8 | Manganous Acetate and | 150 | 55 | 140 |
|   | Sodium Acetate | 50 |   |   |
| 9 | Sodium Acetate | 150 | 480 | 170 |

[1] Concentration expressed as parts of metal ion per million parts by weight of dimethyl terephthalate.

The relative viscosity of the resulting polymer, a measure of the degree of polymerization, was determined in dilute solutions of the polymer in Fomal, which comprises 58.8 parts by weight of phenol and 41.2 parts by weight of trichlorophenol. In all cases the polymer relative viscosities were equivalent or could be controlled by the addition of phosphoric acid according to the teachings of Amborski et al., U.S. Patent No. 2,921,057.

The tabulation shows that the use of sodium acetate in conjunction with manganous acetate is advantageous with respect to acceleration of the ester exchange reaction as compared with the use of manganous acetate alone.

Comparing Run 2 with Run 5 of Table I, it is seen that changing the concentration of catalyst from 150 p.p.m. of manganous acetate to only 100 p.p.m. increases the time required to completely evolve the methanol, but the addition of only 20 p.p.m. sodium acetate to replace 50 p.p.m. of manganous acetate (as in Run 6) is sufficient to complete the reaction in even less time. In addition, it will be noted that the combined catalyst of this invention initiates the ester exchange reaction at a lower temperature which, in continuous processes, results in more efficient use of the exchange plates of the reaction vessel, such as that described in Vodonik U.S. Patent No. 2,829,153 or Vodonik U.S. Patent No. 2,727,882.

EXAMPLE II

The initial rate of ester exchange is readily studied by rate of methanol distillation, although this method is not capable of detecting the efficiency of a particular catalyst for completing the reaction in a fixed reaction time. In a plant operation a catalyst which produces a high initial rate of reaction is desired but it is of little use if it cannot drive the reaction to a low percentage of unconverted dimethyl terephthalate.

In the following Table II the importance of the combination is further demonstrated. A mixture of 100 parts dimethyl terephthalate and 70 parts glycol were reacted according to procedure in Example I. Manganous acetate and sodium acetate catalyst concentrations (expressed as parts of metal ion per million parts by weight of dimethyl terephthalate), and percent unconverted dimethyl terephthalate, are listed in Table II.

TABLE II

| Run | $Mn^{+2}$ (p.p.m.) | $Na^+$ | Percent DMT after 2 Hrs. |
| --- | --- | --- | --- |
| 10 | 150 |   | 0.35 |
| 11 | 100 | 50 | 0.11 |
| 12 | 100 | 50 | 0.10 |
| 13 | 100 | 50 | 0.02 |

The following examples, which deal with the continuous process ester exchange reaction, further demonstrate the utility of the combined manganous acetate and sodium acetate in the ester exchange reaction.

EXAMPLE III

Equipment similar to that described in Vodonik U.S. Patent No. 2,829,153, Example II, column 7, was operated using the conditions and quantities shown in Table III. Typical data are given in Runs 14 and 15 to illustrate the advantageous use of sodium acetate in combination with manganous acetate, when operating at approximately the same thruput.

TABLE III

|   | Run 14 | Run 15 |
| --- | --- | --- |
| Thruput (lb./hr.) | 2,726 | 2,712 |
| Total Pressure Drop (in. of $H_2O$) | 93 | 92 |
| Percent $Mn^{+2}$ in Polymer | 0.0165 | 0.0140 |
| Percent $Na^+$ in Polymer |   | 0.0050 |
| Percent $Sb^{+3}$ in Polymer | 0.0502 | 0.0515 |
| Temperature (° C.) of— |   |   |
| Reboiler | 238.5 | 239.0 |
| Plate: |   |   |
| 1 | 211.0 | 211.0 |
| 5 | 207.2 | 208.5 |
| 11 | 187.0 | 190.0 |
| 13 | 170.0 | 173.0 |
| 15 | 153.0 | 156.0 |
| 17 | 151.8 | 154.6 |
| 19 | 131.8 | 129.0 |
| 20 | 92.0 | 88.0 |

The higher temperatures of plates 5, 11, 13, 15, and 17 indicate a faster rate of ester exchange during Run 15, as compared to Run 14, since a lesser amount of methanol is formed as a result of the more efficient reaction on the plates near the top of the column when using sodium acetate in combination with manganous acetate.

The monomer mixture was withdrawn from the column and filtered through a 1 micron filter cartridge in each run. After each day of operation the filter cartridge of Run 14 required a change due to scale buildup. However, in Run 15 the filter was inspected after 14 days without showing signs of scale buildup or an increase in pressure drop across the filter. After several months operation, the column used for Run 15 was disassembled for inspection and the stainless-steel parts showed none of the signs of pitting or corrosion commonly found on the same equipment when operated with manganous acetate as the sole ester exchange catalyst. In addition, in Run 15 the heating tubes of the reboiler were "metal clean," whereas the tubes were coated with scale when using the catalyst of the prior art.

Since many different embodiments of the invention may be made without departing from the spirit and scope thereof, it is to be understood that the invention is not limited by the specific illustrations except to the extent defined in the following claims.

We claim:

1. In the preparation of filament- and film-forming linear glycol terephthalate condensation polyester from an alkyl ester of terephthalic acid having 1 to 4 carbon atoms in the alkyl group and a glycol of the formula $HO(CH_2)_nOH$, where $n$ is an integer from 2 to 10 inclusive, which process includes the step of heating said alkyl terephthalate and glycol to at least 170° C. in the presence of manganous acetate catalyst to effect ester interchange reaction, the amount of manganous acetate being 0.01% to 0.3% by weight of the amount of said alkyl terephthalate; the improvement for completing the ester interchange reaction in less time, for initiating the ester interchange reaction at a lower temperature, and for substantially eliminating corrosion and scaling of reactor vessels, wherein the improvement comprises carrying out said ester interchange reaction at a temperature of at least about 140° C. in the presence of a mixture of manganous acetate and sodium acetate catalysts in the proportions of 3 to 5 parts by weight of manganous acetate to 1 part by weight of sodium acetate, the amount of manganous acetate in the mixture of catalysts being 0.01% to 0.3% by weight of said alkyl terephthalate.

References Cited

UNITED STATES PATENTS

| | | | |
|---|---|---|---|
| 3,070,575 | 12/1962 | Cramer | 260—75 |
| 3,110,547 | 11/1963 | Emmert | 260—75 |
| 3,161,710 | 12/1964 | Turner | 260—75 |

WILLIAM H. SHORT, *Primary Examiner.*

SAMUEL H. BLECH, LOUISE P. QUAST, *Examiners.*